United States Patent
Honda

(10) Patent No.: US 10,161,415 B2
(45) Date of Patent: Dec. 25, 2018

(54) ELECTRIC PUMP

(71) Applicant: AISAN KOGYO KABUSHIKI KAISHA, Obu-shi, Aichi-ken (JP)

(72) Inventor: Yoshihiko Honda, Obu (JP)

(73) Assignee: AISAN KOGYO KABUSHIKI KAISHA, Obushi, Aichi-Ken (JP)

( * ) Notice: Subject to any disclaimer, the term of this patent is extended or adjusted under 35 U.S.C. 154(b) by 425 days.

(21) Appl. No.: 14/187,244

(22) Filed: Feb. 22, 2014

(65) Prior Publication Data

US 2014/0241903 A1    Aug. 28, 2014

(30) Foreign Application Priority Data

Feb. 25, 2013 (JP) ................................. 2013-034975

(51) Int. Cl.
F04D 29/58 (2006.01)
F04D 5/00 (2006.01)
(Continued)

(52) U.S. Cl.
CPC ......... F04D 29/5813 (2013.01); F04D 5/002 (2013.01); F04D 13/0686 (2013.01);
(Continued)

(58) Field of Classification Search
CPC ............. F02M 37/08; F02M 2037/082; F02M 2037/087; F02M 37/10; F02M 37/22;
(Continued)

(56) References Cited

U.S. PATENT DOCUMENTS 4,998,865 A * 3/1991 Nakanishi ............. F02M 37/08
310/51
5,120,201 A * 6/1992 Tuckey ............... F02D 41/3082
417/366
(Continued)

FOREIGN PATENT DOCUMENTS

JP      H2-145655      12/1990
JP      H4-287886      10/1992
(Continued)

OTHER PUBLICATIONS

English Abstract of Japanese Patent Application No. JP JPH2-145655.
(Continued)

*Primary Examiner* — Charles Freay
(74) *Attorney, Agent, or Firm* — Vierra Magen Marcus LLP

(57) ABSTRACT

An electric pump may comprise a pump portion including an impeller, a motor portion configured to activate the pump portion, and a housing configured to contain the pump portion and the motor portion. The motor portion may comprise a rotor configured to activate the impeller, a stator configured to rotate the rotor, a control circuit configured to control a rotation of the rotor, a resin portion configured to cover the stator, and a heat transferring portion contacting the control circuit and the housing, thermal conductivity of the heat transferring portion being higher than thermal conductivity of the resin portion.

10 Claims, 4 Drawing Sheets

(51) Int. Cl.
  *F04D 13/06* (2006.01)
  *H02K 11/40* (2016.01)
  *H02K 11/30* (2016.01)

(52) U.S. Cl.
  CPC ......... *F04D 29/5893* (2013.01); *H02K 11/30* (2016.01); *H02K 11/40* (2016.01)

(58) Field of Classification Search
  CPC .... F04D 5/002; F04D 13/064; F04D 29/5813; F04D 29/5893; F04D 13/0686; F04B 53/22; H02K 11/0073; H02K 2203/03; H02K 2211/03; H02K 23/04; H02K 5/08; H02K 5/12; H02K 11/40; H02K 11/30; F02D 2200/0602; F02D 2250/31; F02D 41/3082
  USPC .......................................................... 310/64
  See application file for complete search history.

(56) References Cited

U.S. PATENT DOCUMENTS

| 5,356,272 | A | * | 10/1994 | Nagata | F02M 37/08 417/366 |
|---|---|---|---|---|---|
| 5,593,287 | A | * | 1/1997 | Sadakata | F02M 37/08 123/509 |
| 5,810,568 | A | * | 9/1998 | Whitefield | F04C 11/008 417/410.3 |
| 5,932,942 | A | * | 8/1999 | Patyk | H02K 11/33 310/58 |
| 7,042,122 | B1 | * | 5/2006 | Dufala | H02K 3/47 310/179 |
| 7,814,889 | B2 | * | 10/2010 | Mitsuhashi | F02M 37/08 123/497 |
| 8,388,322 | B2 | * | 3/2013 | Scharfenberg | F02M 37/08 417/410.1 |
| 8,707,932 | B1 | * | 4/2014 | Marin | F02D 41/3082 123/479 |
| 2003/0067228 | A1 | * | 4/2003 | Vanjani | H02K 5/18 310/64 |
| 2005/0006963 | A1 | * | 1/2005 | Takenaka | B60K 1/00 310/52 |
| 2006/0279162 | A1 | * | 12/2006 | Achor | H02K 5/12 310/239 |
| 2008/0310976 | A1 | | 12/2008 | Boutros | |
| 2011/0193452 | A1 | * | 8/2011 | Yakushiji | F04B 39/06 310/68 D |
| 2013/0187517 | A1 | * | 7/2013 | Asao | H02K 1/185 310/68 D |
| 2014/0339946 | A1 | * | 11/2014 | Immendoerfer | C23F 13/04 310/179 |

FOREIGN PATENT DOCUMENTS

| JP | H5-71436 | | 3/1993 |
|---|---|---|---|
| JP | H05-211738 | A | 8/1993 |
| JP | H5-280486 | | 10/1993 |
| JP | H6-319247 | | 11/1994 |
| JP | H08-109858 | A | 4/1996 |
| JP | 2001-214826 | | 8/2001 |
| JP | 2001-295797 | A | 10/2001 |
| JP | 2008-309156 | A | 12/2008 |
| JP | 2010-285929 | A | 12/2010 |

OTHER PUBLICATIONS

Family List of Japanese Patent Application No. JPH4-287886.
English Translation of Abstract of Japanese Patent Application No. JPH4-287886.
Family List of Japanese Patent Application No. JPH5-71436.
English Translation of Abstract of Japanese Patent Application No. JPH5-71436.
Machine Translation prepared by the Japanese Patent Office of Japanese Patent Application No. JPH5-71436.
English Translation of Abstract of Japanese Patent Application No. JPH5-280486.
Machine Translation prepared by the Japanese Patent Office of Japanese Patent Application No. JPH5-280486.
English Translation of Abstract of Japanese Patent Application No. JPH6-319247.
Machine Translation prepared by the Japanese Patent Office of Japanese Patent Application No. JPH6-319247.
English Translation of Abstract of Japanese Patent Application No. JP2001-214826.
Machine Translation prepared by the Japanese Patent Office of Japanese Patent Application No. JP2001-214826.
Office Action dated Mar. 15, 2016, in Japanese Patent Application No. 2013-034975.

* cited by examiner

ELECTRIC PUMP

CROSS-REFERENCE TO RELATED APPLICATION

This application claims priority to Japanese Patent Application No. 2013-34975 filed on Feb. 25, 2013, the contents of which are hereby incorporated by reference into the present application.

TECHNICAL FIELD

The present application discloses an electric pump.

DESCRIPTION OF RELATED ART

Japanese Patent Application Publication No. H5-71436 discloses a fuel pump that includes a pump portion and a motor portion which drives the pump portion. The motor portion is controlled by a control circuit portion. The control circuit portion is installed in a stainless vessel. The vessel is covered with a resin material.

BRIEF SUMMARY

According to the above technique, because the control circuit portion is covered with the resin material, the control circuit portion is not easily cooled.

In the present description, a technique for cooling a control circuit, is provided.

The present application discloses an electric pump. The electric pump may comprise a pump portion including an impeller; a motor portion configured to activate the pump portion; and a housing configured to contain the pump portion and the motor portion. The motor portion may comprise a rotor configured to activate the impeller; a stator configured to rotate the rotor; a control circuit configured to control a rotation of the rotor; a resin portion configured to cover the stator; and a heat transferring portion contacting the control circuit and the housing, thermal conductivity of the heat transferring portion being higher than thermal conductivity of the resin portion.

The control circuit is connected to the housing via the heat transferring portion. The housing is contacted to a liquid or a gas that is at an outside of the electric pump. As a result, heat of the control circuit is discharged to an outside of the electric pump via the heat transferring portion and the housing. According to this configuration, the control circuit may be properly cooled.

DETAILED DESCRIPTION

Figure 1:
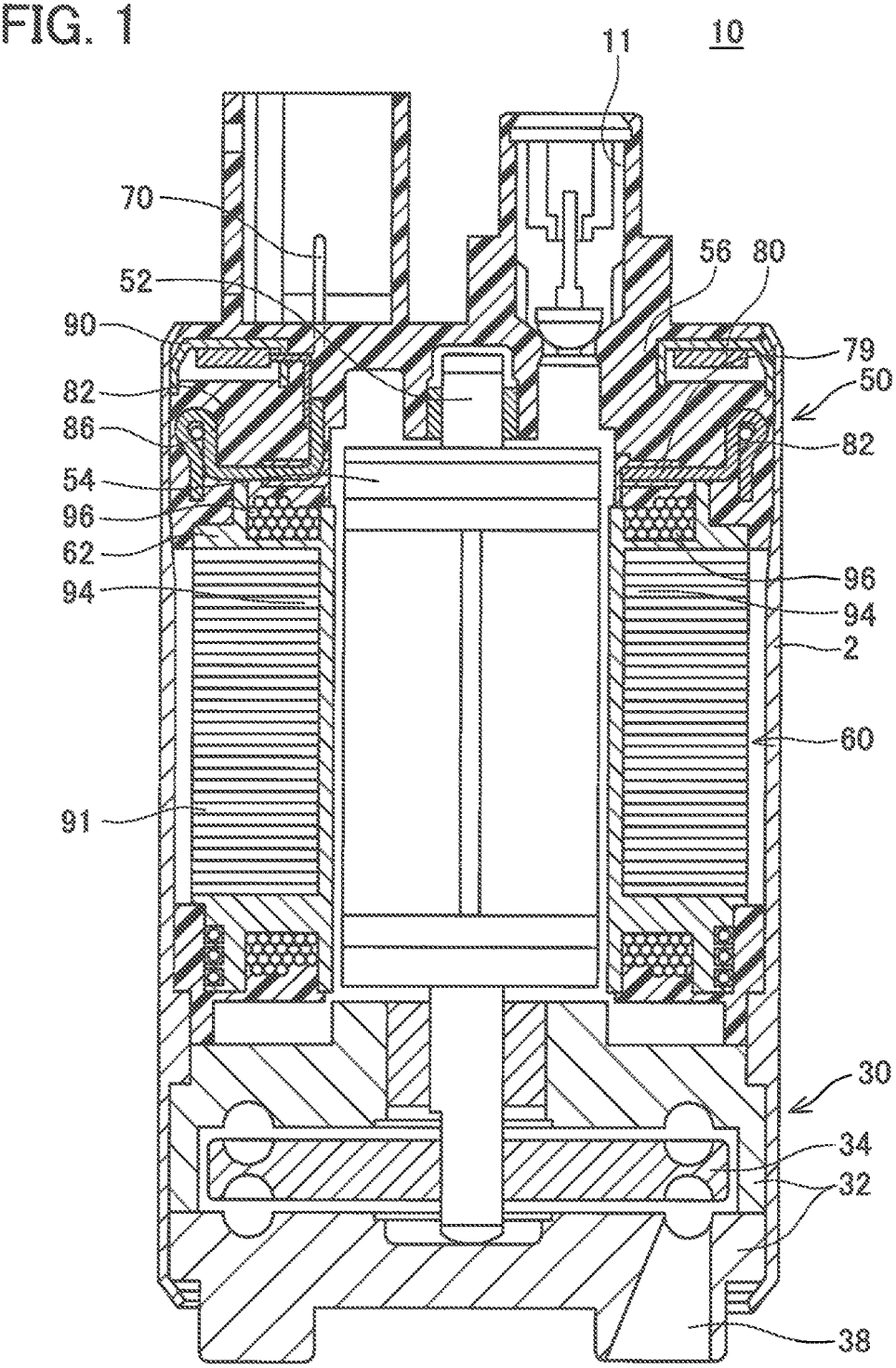
FIG. 1 shows a longitudinal cross-sectional view of a fuel pump of a first embodiment.

Major features of the embodiments described below will be described. Technical elements described below are independent technical elements, and may be utilized separately or in all types of combinations.

(Feature 1) In the electric pump, at least a part of the heat transferring portion may be exposed to outside of the electric pump.

According to this configuration, the heat of the control circuit is discharged to an outside of the electric pump via the heat transferring portion and the housing, and is also directly discharged from the heat transferring portion to an outside of the electric pump. As a result, the control circuit may be more accurately cooled.

(Feature 2) In the electric pump, the heat transferring portion may contain the control circuit.

The heat transferring portion may contain the control circuit.

In this configuration, the control circuit is covered with the heat transferring portion. According to this configuration, the control circuit may he more properly cooled, as compared with a configuration in which a part of the control circuit is covered with a resin member.

(Feature 3) In the electric pump, the heat transferring portion and the housing may have electric conductivities. The heat transferring portion may be configured to be grounded and disposed at an outer side of the electric pump than the control circuit.

According to this configuration, switching noise generated in the control circuit may be reduced. Further, discharge noise of the control circuit may be reduced. As a result, an electronic device disposed at a periphery of the electric pump may be suppressed from being affected by noise of the control circuit.

(Feature 4) In the electric pump, the stator may have a tubular shape. The rotor may be disposed at an inner periphery side of the stator. A liquid discharged from the pump portion may flow between the stator and the rotor and may be discharged from an upper side of the rotor to outside of the electric pump. The control circuit may be disposed away from one of edges of the stator in an axis direction of the stator and may include an opening that is larger than an internal diameter of the stator.

According to this configuration, the flow path of the liquid that flows within the electric pump does not need to be installed to bypass the control circuit. Accordingly, the flow path may be formed to enable the liquid to flow smoothly within the electric pump. As a result, reduction of pump efficiency may be suppressed.

(Feature 5) The electric pump may comprise an pressure sensor configured to measure pressure of liquid within the electric pump. The control circuit may be configured to control the rotation of the rotor using a measurement result of the pressure sensor.

According to this configuration, the control circuit may control the rotation of the rotor corresponding to the pressure of the liquid within the electric pump. Accordingly, the pressure of the liquid that is discharged from the electric pump may be regulated to a proper pressure.

(Feature 6) In the electric pump, the heat transferring portion may be formed integrally with the housing.

(Feature 7) In the electric pump, the controlling circuit may have a ring shape. The heat transferring portion may have a ring shape and be disposed concentrically with the control circuit.

(Feature 8) In the electric pump, the motor portion may include a three-phase motor.

(Feature 9) In the electric pump, the controlling circuit may be configured to transform a direct current into a three-phase alternating current.

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved electric pumps, as well as methods for using and manufacturing the same.

Moreover, combinations of features and steps disclosed in the following detailed description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

(First Embodiment)

Figure 2:
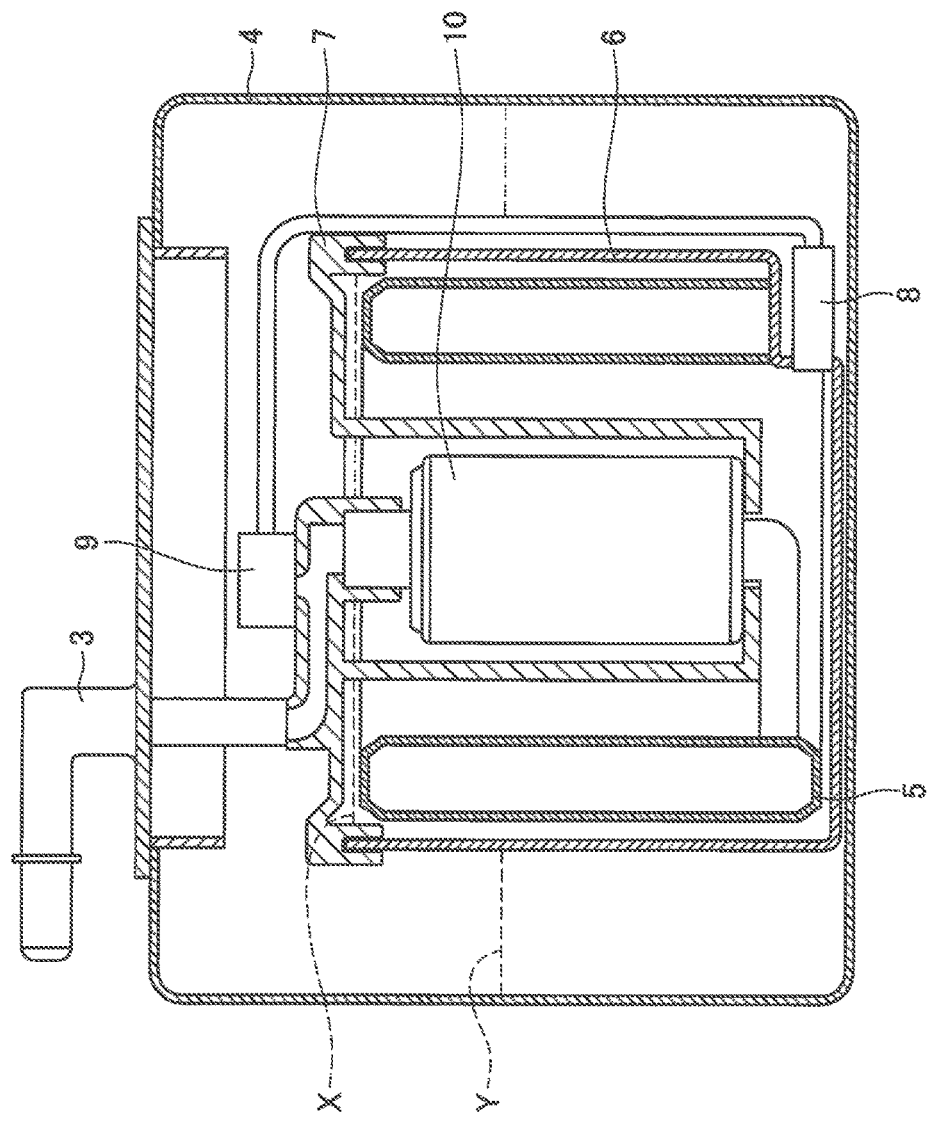
FIG. 2 shows a configuration of a fuel tank of the first embodiment.

As shown in FIG. 2, a fuel pump 10 is disposed within a fuel tank 4, and is configured to supply a fuel (such as gasoline, for example) to an engine (not shown) of an automobile. As shown in FIG. 1, the fuel pump 10 comprises a motor portion 50, a pump portion 30, and a housing 2. The motor portion 50 and the pump portion 30 are disposed within the housing 2. The housing 2 has a cylindrical shape of which both edges are opened. The housing 2 is made of metal (e.g., made of a stainless steel). Therefore, the housing 2 has a higher thermal conductivity than a thermal conductivity of a resin portion 56 described later.

The pump portion 30 comprises a casing 32 and an impeller 34. The casing 32 closes an opening of a lower edge of the housing 2. At the lower edge of the casing 32, an intake port 38 is provided. At an upper edge of the casing 32, a through-hole (not shown) for communicating between an inside of the casing 32 and the motor portion 50 is provided. The impeller 34 is provided within the casing 32.

The motor portion 50 is positioned above the pump portion 30. The motor portion 50 is a brushless motor. The motor portion 50 is a three-phase motor. The motor portion 50 comprises a rotor 54, a stator 60, the resin portion 56, a control circuit 80, and a cover 90 (an example of a heat transferring portion). The rotor 54 comprises a permanent magnet. At a center of the rotor 54, a shaft 52 is fixed by penetrating the rotor 54. A lower edge of the shaft 52 is inserted into a center portion of the impeller 34, and penetrates the impeller 34. The rotor 54 is rotatably supported around the shaft 52 by bearings disposed at both edge portions of the shaft 52. In the embodiment, above and below are stipulated in a state of FIG. 1. That is, the pump portion 30 is positioned "below", viewed from the motor portion 50, and the motor portion 50 is positioned "above", viewed from the pump portion 30.

The stator 60 is disposed at an outer periphery of the rotor 54. The stator 60 comprises a core 91 having a plurality of teeth 94 (e.g., six teeth 94). The core 91 is configured by stacking a plurality of core plates. In FIG. 1, hatched lines for indicating cross sections of the core plates and a coil line 96 are omitted for viewability. The core 91 has a cylindrical shape. The plurality of teeth 94 are disposed at equal intervals, and are extended toward an inner periphery side of the core 91. Inner peripheral surfaces of the teeth 94 have shapes along an outer peripheral surface of the rotor 54. The inner peripheral surfaces of the teeth 94 face the outer peripheral surface of the rotor 54 with a slight gap.

Each tooth 94 is wound by the coil line 96 by having a resin layer 62 sandwiched between the tooth 94 and the coil line 96. Upper and lower edges of the stator 60 are covered with the resin portion 56. The stator 60 is pressurized into the housing 2 in a state of being covered with the resin portion 56. The resin portion 56 closes an opening of an upper edge of the housing 2. A discharge opening 11 is formed at an upper edge of the resin portion 56. The discharge opening 11 communicates between the motor portion 50 and a fuel path at an outside of the fuel pump 10. The discharge opening 11 is an opening for discharging the fuel pressurized in the pump portion 30 to a fuel path 3 (see FIG. 2). The fuel path 3 is connected to a fuel pipe (not shown) extended to the engine.

The control circuit 80 is disposed away from an upper edge of the stator 60 in an axis direction (that is, an axial line direction of the shaft 52). The control circuit 80 has a plurality of electronic parts (for example, diodes) mounted on a ring-shaped substrate. The control circuit 80 is disposed concentrically with the rotor 54 and an inner peripheral surface of the teeth 94. An internal diameter of the control circuit 80 is larger than an external diameter of the rotor 54. The internal diameter of the control circuit 80 is also larger than a diameter of a cylinder configured by the inner peripheral surface of the teeth 94.

The control circuit 80 is connected to an external terminal 70. The external terminal 70 is extended from the control circuit 80 to above the resin layer 62. The external terminal 70 connects between a battery of the automobile and the control circuit 80. The external terminal 70 includes a positive electrode terminal and a negative electrode terminal. The control circuit 80 is connected to a terminal 82 of the stator 60. The terminal 82 includes three supply terminals corresponding respectively to three phases, and a common terminal that is common to the three phases. The control circuit 80 transforms a DC (i.e., Direct current) current supplied from the battery into a three-phase AC (i.e., Alternating Current) current, and supplies the three-phase AC current to three supply terminals.

Each of the three supply terminals of the terminal 82 is connected to the coil line 96 that is wound around each of three teeth 94 out of the six teeth 94. Each of the coil lines 96 of the three teeth 94 is connected to each of the coil lines 96 of the rest three teeth 94. As a result, corresponding to a phase of a current supplied to the coil line 96, the six teeth 94 are classified into two U-phase teeth 94, two V-phase teeth 94, and two W-phase teeth 94. The common terminal of the terminal 82 is connected to the coil lines 96 of the rest three teeth 94.

An upper side of the control circuit 80 is covered with a cover 90. The cover 90 is made of a material having a higher thermal conductivity than that of the resin portion 56, and a material having an electric conductivity (such as an aluminum alloy, and a stainless steel, for example). The cover 90 is formed in a circular-ring shape. The cover 90 is disposed concentrically with the control circuit 80. An internal diameter of the cover 90 is larger than an external diameter of the rotor 54. Further, the internal diameter of the cover 90 is larger than the diameter of the cylinder configured by the inner peripheral surface of the teeth 94. The cover 90 has a trench of a circular-ring shape of which a lower edge is opened. A space of a circular-ring shape is defined by the cover 90 and the resin portion 56 which is positioned below the cover 90. The control circuit 80 is adhered to a lower surface of an upper wall of the cover 90, and is housed in the space of the circular-ring shape. An outer peripheral surface of the cover 90 is contacted to the housing 2 along a whole periphery of the cover 90. As a modification, the outer peripheral surface of the cover 90 may be contacted to the housing 2 at a part of the cover 90 in a peripheral direction. The cover 90 is electrically contacted to the negative electrode terminal of the external terminal 70.

As shown in FIG. 2, the fuel pump 10 is housed within a reservoir cup 6 disposed within the fuel tank 4. The fuel pump 10 is supported by the reservoir cup 6 via a pump case 7. To the reservoir cup 6, during driving of the fuel pump 10, a fuel at an outside of the reservoir cup 6 is supplied from a jet pump 8. The jet pump 8 draws the fuel at an outside of the reservoir cop 6 into the reservoir cup 6, by using a surplus fuel discharged from a pressure regulator 9. Therefore, even when a liquid level of the fuel at the outside of the reservoir cup 6 becomes lower than a liquid level Y, for example, a liquid level X of the fuel within the reservoir cup 6 is maintained near an upper edge of the fuel pump 10.

When the engine of the automobile is driven, power is supplied to the control circuit 80, and the fuel pump 10 is driven. The control circuit 80 supplies a three-phase AC current to the stator 60. The control circuit 80 controls the current to be supplied to the stator 60, corresponding to a rotation of the rotor 54. Accordingly, the rotation of the rotor 54 is controlled. Following the rotation of the rotor 54, the impeller 34 is rotated. Accordingly, the pump portion 30 draws in the fuel within the reservoir cup 6 via a filter 5, pressurizes the fuel, and discharges the fuel to the motor portion 50.

Within the motor portion 50, the fuel passes between the rotor 54 and the stator 60, and flows toward the discharge opening 11. The control circuit 80 and the cover 90 have internal diameters larger than the external diameter of the rotor 54, and larger than the diameter of the cylinder configured by the inner peripheral surface of the teeth 94. Therefore, the control circuit 80 and the cover 90 are not disposed on the flow path of the fuel within the fuel pump 10. The flow path of the fuel that flows within the fuel pump 10 does not need to be installed to bypass the control circuit 80 and the cover 90. Accordingly, the flow path can be formed to enable the fuel to flow smoothly within the fuel pump 10. As a result, reduction of pump efficiency of the fuel pump 10 can be suppressed.

During driving the fuel pump 10, electronic parts of the control circuit 80 generate heat. The control circuit 80 is connected to the housing 2 via the cover 90. The housing 2 is contacted to the fuel within the reservoir cup 6. As a result, the heat of the control circuit 80 is discharged to an outside of the fuel pump 10 via the cover 90 and the housing 2 of which thermal conductivities are relatively high. According to this configuration, the control circuit 80 can be properly cooled.

Further, because the fuel pump 10 is disposed within the reservoir cup 6, the fuel pump 10 is normally immersed in the fuel. According to this configuration, as compared with a case that the fuel pump 10 is contacted to a gas within the fuel tank 4, cooling efficiency of the control circuit 80 improves.

The cover 90 has an electric conductivity, and is contacted to the negative electrode. According to this configuration, switching noise generated by the control circuit 80 can be reduced. Further, discharge noise of the control circuit 80 can be reduced. As a result, an electronic device disposed at a periphery of the fuel pump 10 (for example, a liquid level sensor for specifying a liquid level of the fuel) can be suppressed from being affected by noise of the control circuit 80.

The cover 90 covers the upper side of the control circuit 80. That is, the cover 90 is positioned at an outside of the control circuit 80, viewed from a center position of the fuel pump 10. According to this configuration, noise generated by the control circuit 80 can be properly reduced.

Pressure resistance of the resin portion 56 can be improved by the cover 90.

(Second Embodiment)

Figure 3:
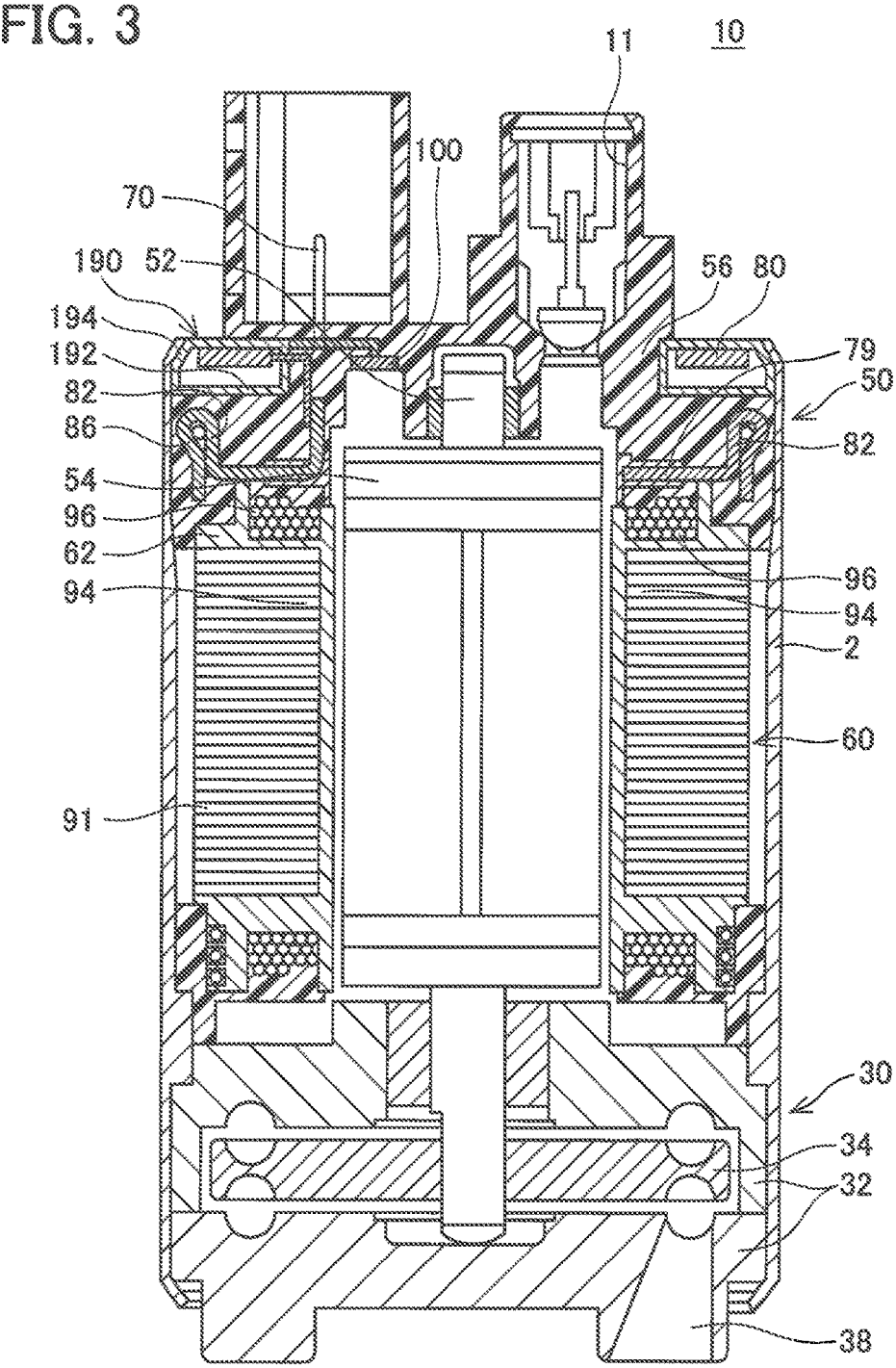
FIG. 3 shows a longitudinal cross-sectional view of a fuel pump of a second embodiment.

Differences from the first embodiment are described. As shown in FIG. 3, the fuel pump 10 in the second embodiment comprises a case 190 (an example of a heat transferring portion), in place of the cover 90. The case 190 comprises a bottom surface 192 and a cover 194. The cover 194 has the same configuration as that of the cover 90. The bottom surface 192 closes an open portion of a circular-ring shape at a lower edge of the cover 194. The case 190 is made of a material similar to that of the cover 90. An upper surface of the cover 194 is not covered with the resin portion 56 over a whole periphery, and is exposed to the fuel within the reservoir cup 6. The control circuit 80 is housed in the case 190. According to this configuration, heat of the control circuit 80 is discharged to an outside of the fuel pump 10 via the case 190 and the housing 2, and is also directly discharged from the case 190 to an outside of the fuel pump 10. Accordingly, cooling efficiency of the control circuit 80 improves. Further, the control circuit 80 is covered with the case 190. According to this configuration, as compared with a configuration that a part of the control circuit 80 is covered with a resin member, cooling efficiency of the control circuit 80 improves.

The fuel pump 10 further comprises a pressure sensor 100. A sensing portion of the pressure sensor 100 is exposed to the fuel within the fuel pump 10 above the rotor 54. The sensing portion includes a diaphragm, for example. The pressure sensor 100 transforms a pressure change of the fuel detected by the sensing portion into an electric signal, and supplies the electric signal to the control circuit 80.

The control circuit 80 controls the pump portion 30 by regulating a rotation of the rotor 54 corresponding to a pressure of the fuel within the fuel pump 10. Specifically, when a pressure of the fuel within the fuel pump 10 becomes high, the control circuit 80 decreases a rotation speed of the rotor 54. As a result, the pressure of the fuel within the fuel pump 10 decreases. On the other hand, when a pressure of the fuel within the fuel pump 10 becomes low, the control circuit 80 increases a rotation speed of the rotor 54. As a result the pressure of the fuel within the fuel pump 10 increases. According to this configuration, the control circuit 80 can control the pump portion 30 corresponding to the pressure of the fuel within the fuel pump. Accordingly, the pressure of the fuel discharged from the fuel pump 10 can be regulated to a proper pressure.

The fuel pump 10 according to the second embodiment can also obtain an effect similar to that of the fuel pump according to the first embodiment.

(Third Embodiment)

Figure 4:
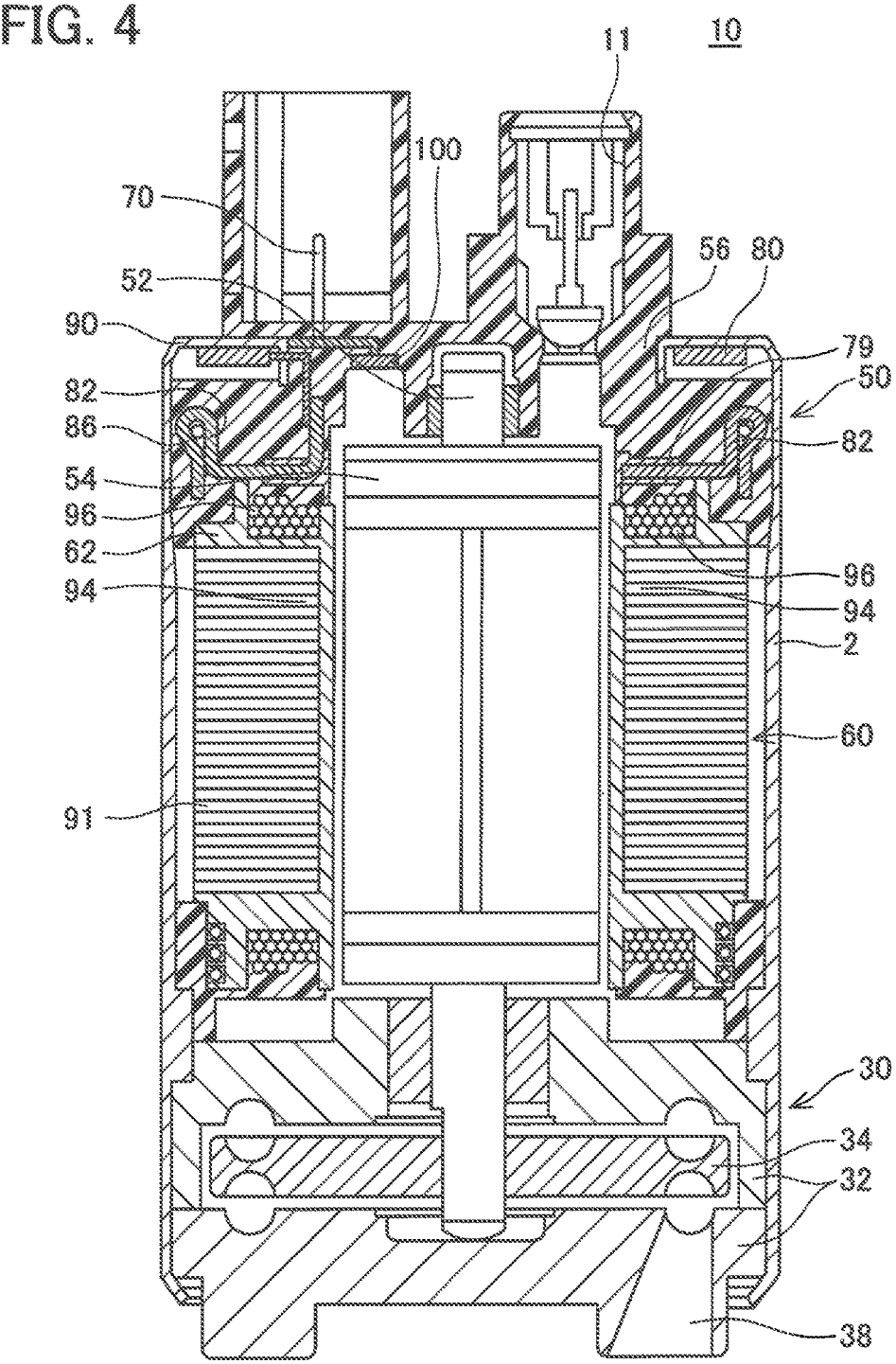
FIG. 4 shows a longitudinal cross-sectional view of a fuel pump of a third embodiment.

Differences from the first embodiment are described. As shown in FIG. 4, in the fuel pump 10 of the third embodiment, the cover 90 is manufactured integrally with the housing 2. The upper surface of the cover 90 is not covered with the resin portion 56 along a whole periphery, and is exposed to the fuel within the reservoir cup 6. This configuration also has an effect similar to that of the first embodiment. Because a part of the cover 90 is exposed to the fuel in a similar manner to that in the second embodiment, cooling efficiency improves.

(Modifications)

(1) In each of the above embodiments, the control circuit 80 has a circular-ring shape. However, the control circuit 80 may have other shape. For example, the control circuit 80 may have a polygonal ring shape. Alternatively, the control circuit 80 may be a rectangular flat plate. In this case, an opening may be formed in the control circuit 80 so as not to interfere with the flow path of the fuel within the fuel pump 10, or the control circuit 80 may be divided into a plurality of portions. In this case, the cover 90 and the case 190 may be in polygonal ring shapes or may be polyhedral casings to match the shape of the control circuit 80.

(2) In each of the above embodiments, the fuel pump 10 comprises one control circuit 80. However, the fuel pump 10 may comprise a plurality of control circuits. In this case, electronic parts of a large heat value may be disposed in one control circuit, and electronic parts of a small heat value may be disposed in other control circuits. In this case, the control circuit in which the electronic parts of a large heat value are disposed may be contacted to the cover 90 or the case 190, and the control circuits in which the electronic parts of a small heat value are disposed may not be contacted to the cover 90 or the case 190.

(3) In each of the above embodiments, the cover 90 and the case 190 are connected to the negative electrode. However, the cover 90 and the case 190 may not be connected to the negative electrode. In this case, the cover 90 and the case 190 may be grounded via a conductor. For example, when the housing 2 is grounded, the cover 90 and the case 190 may be grounded via the housing 2.

(4) The cover 90 and the case 190 may not have electric conductivities. In this case, the cover 90 and the case 190 may not be grounded.

(5) In each of the above embodiments, the cover 90 and the case 190 are directly contacted to the housing 2. However, the cover 90 and the case 190 may be contacted to the housing 2 via a member made of a material of a high thermal conductivity.

(6) The "heat transferring portion" in the present description may be a member of a high thermal conductivity that is contacted to the control circuit 80 and is also contacted to the housing 2, in addition to the cover 90 and the case 190. For example, the "heat transferring portion" may be a rectangular flat plate.

(7) The "electric pump" in the present description may be various electric pumps such as an electric pump for cooling water, in addition to the fuel pump 10.

The invention claimed is:

1. An electric pump comprising:
a pump portion including an impeller;
a motor portion configured to activate the pump portion; and
a housing configured to contain the pump portion and the motor portion, wherein
the motor portion comprises:
 a rotor configured to activate the impeller;
 a stator configured to rotate the rotor;
 a control circuit configured to control a rotation of the rotor;
 a resin cover configured to cover the stator;
 a heat transfer cover covering the control circuit and abutting both the control circuit and a portion of an interior surface of the housing, thermal conductivity of the heat transfer cover being higher than thermal conductivity of the resin cover, and the heat transfer cover configured to be grounded and disposed on an outer side of the electric pump than the control circuit; and
the resin cover including a resin portion covering a part of a surface of the heat transfer cover, wherein
another part of the surface of the heat transfer cover is exposed outside of the electric pump.

2. The electric pump as in claim 1, wherein
the heat transfer cover contains the control circuit.

3. The electric pump as in claim 1, wherein
the heat transfer cover and the housing have electric conductivity.

4. The electric pump as in claim 1, wherein
the stator has a tubular shape,
the rotor is disposed at an inner periphery side of the stator, and
a liquid discharged from the pump portion flows between the stator and the rotor and is discharged from an upper side of the rotor to outside of the electric pump, and
the control circuit is disposed away from one of edges of the stator in an axis direction of the stator and includes an opening that is larger than an internal diameter of the stator.

5. The electric pump as in claim 1, further comprising:
an pressure sensor configured to measure pressure of liquid within the electric pump, wherein
the control circuit is configured to control the rotation of the rotor using a measurement result of the pressure sensor.

6. The electric pump as in claim 1, wherein
the controlling circuit has a ring shape, and
the heat transferring portion has a ring shape and is disposed concentrically with the control circuit.

7. The electric pump as in claim 1, wherein
the motor portion includes a three-phase motor.

8. The electric pump as in claim 7, wherein
the controlling circuit is configured to transform a direct current into a three-phase alternating current.

9. The electric pump as in claim 1, further comprising:
a discharge opening configured to discharge fuel pressurized in the pump portion, wherein the discharge opening is integrally disposed with the resin cover.

10. An electric pump comprising:
a pump portion including an impeller;
a motor portion configured to activate the pump portion; and
a housing configured to contain the pump portion and the motor portion, wherein the motor portion comprises:
 a rotor configured to activate the impeller;
 a stator configured to rotate the rotor;
 a control circuit configured to control a rotation of the rotor;
 a resin cover configured to cover the stator;
 a heat transfer cover covering the control circuit, abutting the control circuit and formed integrally with the housing, thermal conductivity of the heat transfer cover being higher than thermal conductivity of the resin cover, and the heat transfer cover configured to be grounded and disposed an outer side of the electric pump than the control circuit, and the resin cover including a resin portion covering a part of a surface of the heat transfer cover, wherein another part of the surface of the heat transfer cover is exposed to outside of the electric pump.

\* \* \* \* \*